March 15, 1932. W. C. SCHEU 1,849,207
ORCHARD HEATER
Filed Feb. 18, 1931 3 Sheets-Sheet 1
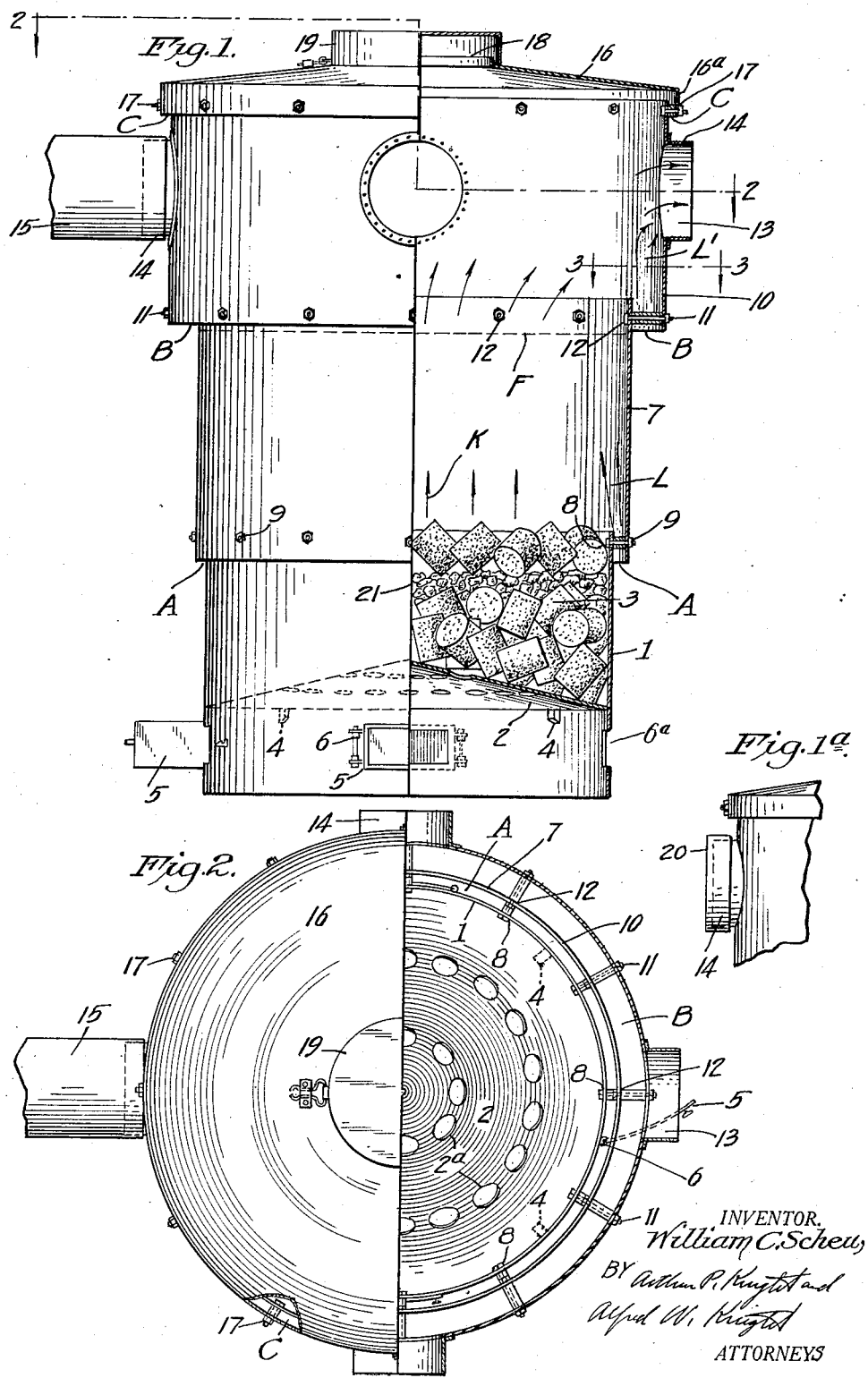

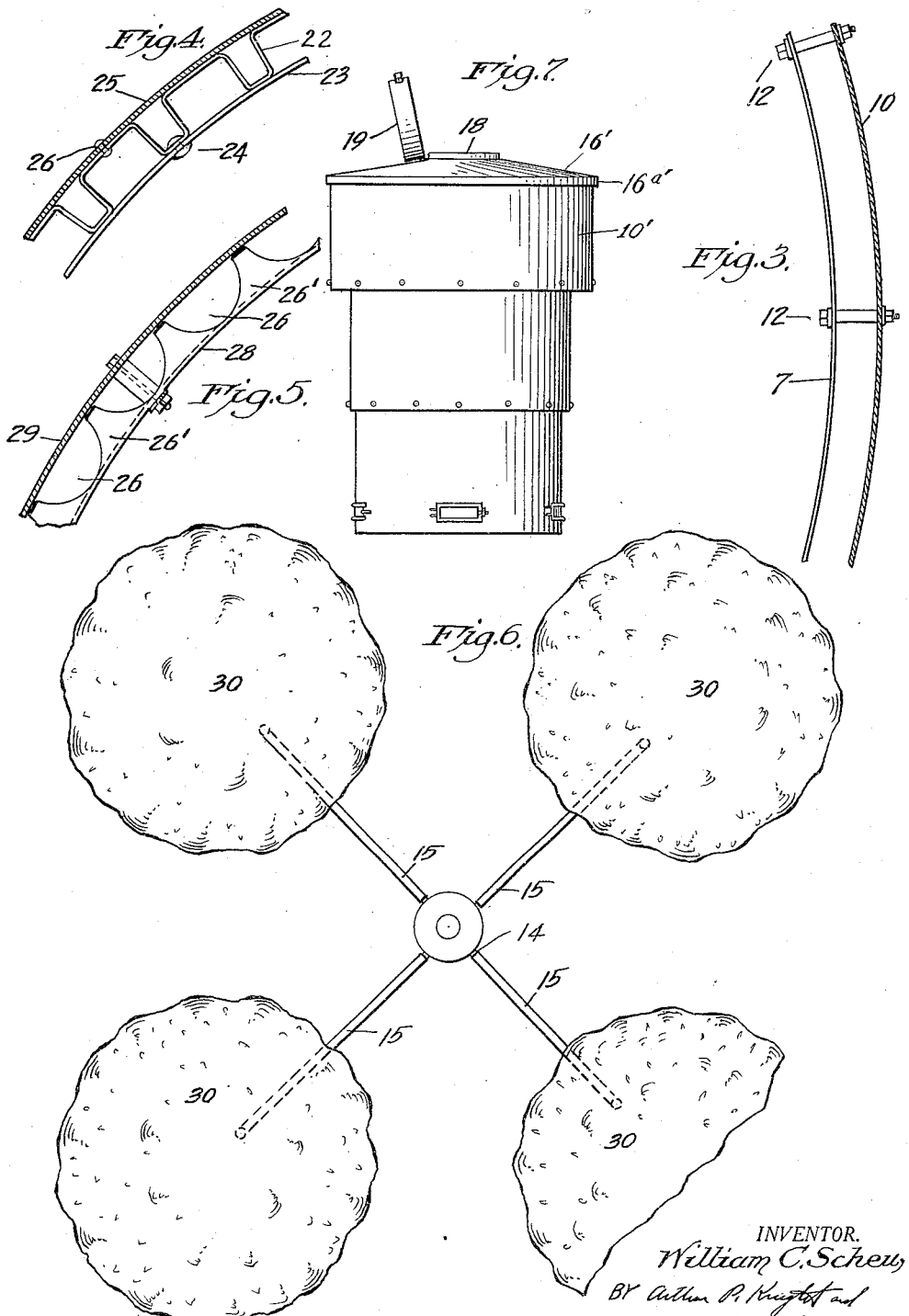

March 15, 1932.   W. C. SCHEU   1,849,207
ORCHARD HEATER
Filed Feb. 18, 1931   3 Sheets-Sheet 3
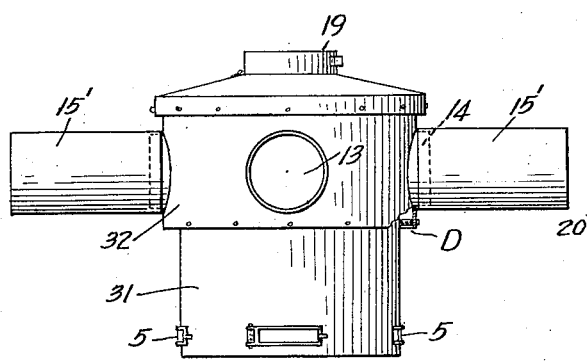
Fig. 8.
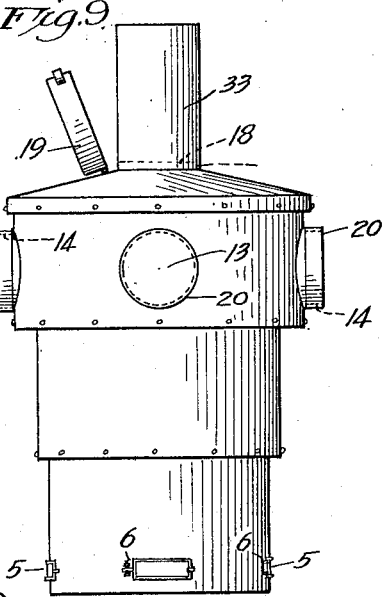
Fig. 9.
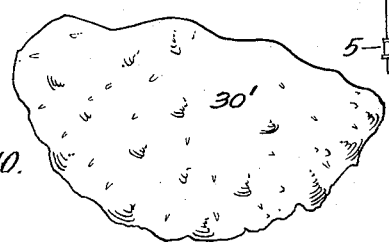
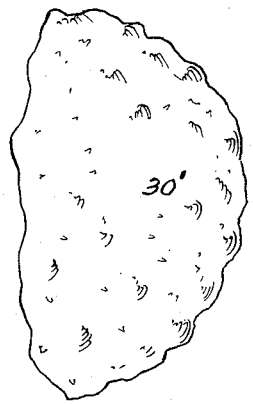
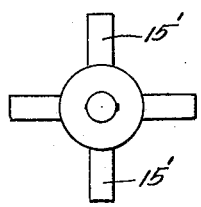
Fig. 10.
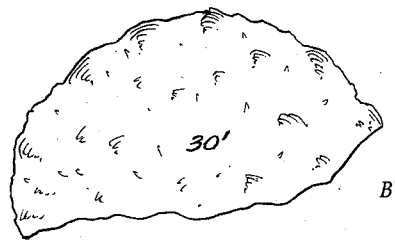
INVENTOR.
William C. Scheu,
BY Arthur P. Knight and
Alfred W. Knight
ATTORNEYS.

Patented Mar. 15, 1932

1,849,207

UNITED STATES PATENT OFFICE

WILLIAM C. SCHEU, OF UPLAND, CALIFORNIA, ASSIGNOR TO SCHEU PRODUCTS COMPANY LIMITED, OF ONTARIO, CALIFORNIA, A CORPORATION OF CALIFORNIA

ORCHARD HEATER

Application filed February 18, 1931. Serial No. 516,614.

This invention relates to orchard heaters and particularly to orchard heaters adapted to utilize solid fuel.

The principal object of this invention is to provide a solid fuel orchard heater of such design and construction as to provide efficient combustion of fuel and efficient use of the heat produced in heating the trees or plants to be protected against injury by cold.

A particular object of the invention is to provide an orchard heater having novel and advantageous means for effecting a production of a large volume of heated gases at a temperature which precludes the possibility of harming trees or foliage exposed to such gases by scorching or burning, together with means for accomplishing effective distribution of such gases laterally from the heater and preferably in close proximity to the trees.

A further object of this invention is to provide an orchard heater having improved means for effecting proper combustion of the solid fuel regardless of the quantity of fuel present in the heater.

A further object of the invention is to provide an orchard heater having means whereby but a part of the air necessary to support combustion of the solid fuel is admitted beneath the combustion-bed and further air is admitted to the heater at successively higher levels.

A further object of the invention is to provide an orchard heater in which the walls thereof, above the combustion chamber proper, are cooled by the upward influx of atmospheric air through apertures disposed circumferentially around said heater at two or more successively higher levels.

A further object of the invention is to provide novel and advantageous means, in a solid fuel heater, for admitting air to the combustion space circumferentially at a plurality of levels while preventing access of rain or wind to such combustion space.

The orchard heater of my present invention comprises, in general, a combustion chamber constructed of a plurality of sections of cylindrical or other suitable shape, in which each section is larger in diameter than the section below it and to which it is attached, the lower section thereof comprising a fuel receptacle and combustion-bed or grate preferably fabricated of cast iron or other material adapted to withstand heat, serving as a base for the heater and a support for the solid fuel with which the heater is charged, together with suitable draft-controlling means such as doors or louvres disposed below such combustion-bed, and each upper section thereof overlapping the next lower section and having its lower edge portion attached to the upper edge portion of said next lower section in such a manner as to leave, due to the difference in the diameter of the two sections, a shielded annular ring-shaped aperture or space between the top portion of each section and the bottom portion of the next higher section for the passage of air from the atmosphere to the combustion-chamber. The uppermost section is provided with a cover having an opening for charging of fuel into the heater and for ignition of such fuel and, if desired, for outlet of hot combustion products, and is also preferably provided with a plurality of openings or outlet passages in the sides extending laterally, designed to receive pipes or flues which serve as exhaust ducts to distribute the heater gases as hereinafter described. The charging opening in the cover is provided with movable closure means such as a hinged cap, and is preferably located centrally of the cover so that it may be used as an exhaust opening or stack, either alternatively to the lateral openings aforesaid or in conjunction therewith.

The accompanying drawings illustrate orchard heaters according to my invention and referring thereto:

Fig. 1 is a partly sectional side elevation of a preferred embodiment of my invention with a bed of solid fuel in place.

Fig. 1a is a side elevation of a portion of the heater shown in Fig. 1 provided with a cap over one of the lateral exhaust openings.

Fig. 2 is a partly sectional plan view on line 2—2 in Fig. 1 without the solid fuel being in place.

Fig. 3 is a partly sectional plan detail of one form of section-attaching means, along line 3—3 in Fig. 1.

Fig. 4 is a partly sectional plan detail of an alternate form of section-attaching means.

Fig. 5 is a partly sectional plan detail of another alternate form of section-attaching means.

Fig. 6 is a plan view of heater shown in Figs. 1 and 2 showing layout of exhaust ducts to trees according to my invention.

Fig. 7 is a side elevation of an alternative form of orchard heater according to my invention.

Fig. 8 is a side elevation of an alternative form of orchard heater according to my invention.

Fig. 9 is a side elevation of the heater shown in Figs. 1 and 2 with caps over exhaust ducts and stack connected to exhaust and fuel charging opening.

Fig. 10 is a plan view of heater shown in Fig. 9, showing layout of short exhaust ducts according to my invention.

Referring to Figs. 1, 1a, 2 and 3, the embodiment of my present invention there shown comprises a lower or base section 1, provided with a conically shaped grate or combustion-bed 2 having perforations 2a suitably disposed therein, supporting the solid fuel 3. Said combustion bed rests on lugs 4, disposed on base 1, and is preferably placed loosely thereon so as to be removable. Draft doors 5 are provided below said combustion-bed, said doors being movably disposed on base 1 as by means of hinges 6, said doors being movable to close or variably open draft openings 6a in section 1. Another section 7 has its lower edge portion overlapping and attached to the upper edge portion of base 1 at points 8, 8 by suitable means such as spacing bolts 9, 9, leaving a shielded aperture or space A extending circumferentially around the upper portion of base 1 in the form of an annular ring. Similarly, an uppermost section 10 has at its lower edge portion overlapping and attached to the upper edge portion of section 7 at points 12, 12, by suitable means such as spacing bolts 11, 11, leaving a shielded aperture or space B, which is formed as an annular ring similar to space A but preferably of substantially greater radial width. Lateral exhaust openings 13, 13 are provided in the side wall of section 10, having sleeves 14, 14 designed to receive flues or ducts such as shown at 15, in frictional contact. Cover 16, preferably formed as a shallow cone frustum, is mounted on the top section 10 by suitable means as by bolts 17 preferably in such a manner as to provide an annular aperture or space C between the overlapping rim 16a of cover 16 and the upper edge portion of section 10 and provided with a centrally located exhaust stack and fuel-charging and igniting opening 18 equipped with hinged cover or cap 19. Sleeves 14 of openings 13 are preferably provided with removable caps 20 for use when for any reason one or more of said exhaust openings 13 are desired to be kept closed.

Solid fuel 3 is shown in Fig. 1 as provided with a layer of more combustible material or kindling fuel 21 adjacent the top of the fuel-bed so as to facilitate ignition of said fuel 3. Said kindling fuel may consist of oil-soaked shavings or excelsior, or shaving briquettes or of oil soaked carbon briquettes.

Fig. 4 shows a detail of an alternative form of section-attaching means in which 22 is a corrugated strip attached to a lower section 23 (corresponding, for instance, to section 7, Fig. 1) by suitable means such as by riveting, as at 24, and attached to an upper section 25 (corresponding, for instance, to section 10, Fig. 1) as at 26, said corrugated strip 22 extending completely around section 23 and completely surrounded by section 25 and attached to sections 23 and 25 at a number of points sufficient to produce a stable attachment.

Fig. 5 shows a detail of another alternate form of section-attaching means in which the upper edge of a lower section 28 has been serrated or scalloped as at 26 and the projections 26′ between these serrations or scallops bent outwardly substantially at right angles to the vertical walls of the lower section as shown, said horizontally-bent projections serving as spacing means, and bolts 27, attached at suitable intervals to the lower section 28 and to the upper section 29 (corresponding to, for instance, sections 7 and 10 in Fig. 1, respectively) serving principally as supporting means whereby upper section 29 is held by lower section 28. The serrations 26 are continuous around the top of section 28 and bolts 27 are spaced sufficiently close together to produce a stable support of section 29.

It will be understood that in Figs. 4 and 5 the upper sections 25 and 29 respectively overlap the lower sections 23 and 28, as before, so as to provide an annular shielded air admitting aperture therebetween.

Fig. 6 shows a plan layout of the above described orchard heater with ducts 15 in place, connected to sleeves 14 and opening at their ends beneath adjacent trees or plants 30, so as to convey the heated gases produced by the combustion of the solid fuel in said heater to points substantially beneath the branches or to the immediate proximity of said trees or plants so as to heat same to the best advantage, according to my invention.

Fig. 7 shows an alternate form of orchard heater according to my invention, which comprises a heater substantially as above described with the exception that the exhaust openings 13 are omitted and the outflow of hot combustion products takes place through the exhaust and fuel charging opening 18, hinged cover 19 being laid back to allow the free passage of gases through said opening 18. In this case, the cover 16' is shown as fitting tightly on the top section 10' of the heater, said cover having a depending flange 16a' frictionally engaging the upper edge portion of said top section. It will be understood that either this means of mounting the cover, or the means shown in Fig. 1 may be used in any of the forms of the invention shown.

Fig. 8 shows an alternate form of orchard heater which comprises a heater substantially as above described with the exception that the heater is composed of but two sections, a lower section 31 and an upper section 32 attached thereto in the above described manner so as to leave an annular aperture or space D, said upper section 32 being provided as above with exhaust openings 13 and flanges 14 to which may be attached short exhaust ducts 15' to provide a partial lateral dissemination of the exhaust gases in the direction of the trees. This heater is provided with a cover 16 and fuel charging opening 18 and cover 19 as in the heater illustrated in Figs. 1 and 2.

Fig. 9 shows substantially the form of heater illustrated in Figs. 1 and 2 with the exhaust opening caps 20 in place on the flanges 14 and provided with a short vertical stack 33 in frictional engagement with flange 18' of exhaust and fuel charging opening 18, hinged cap 19 being laid back as shown to permit placement of said vertical stack 33.

Fig. 10 shows a plan layout of a heater of a form illustrated in Figs. 1 and 2, or 8 or 9 provided with the short lateral disseminating exhaust ducts 15' in place, which heater serves to provide a partial dissemination of the exhaust gases toward the trees to be protected.

An orchard heater constructed according to my invention offers, in operation, a development which, to the best of my knowledge and experience, is entirely new to the art. The orchard heaters in use at the present time depend substantially upon heating the entire region of an orchard in order to maintain the trees and the immediately surrounding air at the necessary temperature, though in some few heaters, it is claimed that there is an appreciable amount of heat radiated from the walls and body of the heater. It is obvious that in the case of an orchard heater that involves combustion of oil or other fuel in the bottom of a device which merely provides a place for such combustion and a stack for the continuous exhaust of the products of combustion upwardly, the exhaust gases are delivered at the top of the stack at rather a high temperature and at relatively a low volume. This gas will tend to rise vertically from the heater in an undisturbed column until the heat thereof is dissipated in the higher atmosphere. Furthermore, such heaters must be spaced somewhat away from the trees on account of the high temperature of the discharged combustion products, and it will be evident that such methods of heating are inherently wasteful and inefficient. Reference to these disadvantages is found on page 15 of Bulletin No. 442 of University of California, College of Agriculture, on Laboratory Tests of Orchard Heaters. There have been a number of attempts to dissipate the hot gases laterally through the orchard by the use of elaborate centrifugal machines located at a few strategic points in the orchard, but so far none of them have enjoyed a very wide popularity, due principally to the relatively large initial and operating costs of such mechanisms.

The ideal form of orchard heating system from certain standpoints would perhaps be one in which warm air was forced from a central heating plant through suitable flues to beneath each tree in the orchard in the same manner as a central-heating plant of the warm-air type, installed in the basement of a dwelling, delivers warm air to the individual rooms. Such an installation would, of course, be impracticable in an orchard for many reasons, such as high cost of installation and lack of efficiency of a system which would necessitate the transportation of warm air over considerable distance.

An orchard heater according to my invention has many of the good points of a centrally-located single plant and few, if any, of its disadvantages. In my heater, a large volume of gases and atmospheric air is exhausted at a temperature much lower than that delivered by the conventional type of heater and is discharged immediately under the tree or trees to be protected and is subsequently laterally disseminated by the leaves and branches of said trees, effectively giving up its heat to the trees before being released into the upper reaches of the atmosphere. The advantages of a heater of this type over a heater which emits a stream of very hot gases substantially vertically upward at a point removed from the trees are patently obvious.

Referring to the accompanying drawings which illustrate embodiments of my invention, a bed of solid fuel 3, which may be any combustible solid material such as coke-briquettes, together with a sufficient amount of more readily ignited material 21 such as oil-soaked excelsior or shavings, is laid on the combustion-bed 2 and ignited in any suitable manner such as by pouring a quantity of lighted kerosene-gasoline mixture or other inflammable liquid through opening 18 as by means of a usual lighting torch. Upon the regulation of draft doors 5 a satisfactory burning of the fuel 3 is soon realized and the heated gases are produced as follows: The hot products of combustion and generated vapors, shown by arrows at K in Fig. 1, are driven upward by convection, inducing a flow of atmospheric air upward through the annular apertures A and B as shown by the arrows at L and L'. This induced volume of cold air is commingled with the hot products of combustion in the upper portion of the heater and in the distributing pipes 15, and a portion thereof is utilized to complete the combustion of combustible vapor generated in the fuel bed. The heat transfer between products of combustion and air being quite effective under such conditions, the excess air is rapidly heated by the afore-mentioned products of combustion which are in turn cooled. The mixed combustion gases and excess air, with their temperature sufficiently lowered to prevent damage to the trees, are preferably distributed through pipes 15 underneath the trees as above described. The annular apertures A and B are formed with the upper section walls 10 and 7 overlapping the lower section walls 7 and 1 respectively, for the express purpose of providing an opening of a type to which rain and wind has little access and which opening by virtue of its shape, will tend to impart a substantially upward velocity to the induced atmospheric air.

The admission of atmospheric air through the annular apertures A and B, Fig. 1, is accomplished for three distinct reasons: (a) to provide for the induction of a large quantity of cold gases which serve to lower the discharge temperature of the products of combustion and increase the quantity of gases available for heating purposes, as above described; in this connection it is particularly advantageous to make the upper ring-shaped aperture B of greater radial width, and consequently of materially greater area, than the lower aperture A, so that the major portion of the air admixed with the hot combustion gases is drawn through this upper aperture, which provides the desired lowering of the temperature of the gases before coming in contact with the trees, while at the same time permitting maintenance within and directly above the body of fuel of a temperature sufficiently high to provide efficient combustion of such fuel and of combustible vapors arising therefrom; (b) to effect a cooling action on the side walls of the sections above said apertures which materially diminishes the destructive action of the hot gases upon the side-wall material; and (c) to provide additional air for the support of combustion within the upper portion of the heater as in the case where additional fuel is added through the charging aperture 18 to the burning bed of fuel and where such solid fuel is used which contains volatile constituents of a combustible nature which are distilled out of such solid fuel resting on and above the hot burning-layer and exposed to the excessive heat thereof and which volatile constituents would otherwise pass out unburned unless an excessive amount of atmospheric oxygen is admitted beneath the combustion-bed, but which, in the heater of my present invention, contact with additional atmospheric air admitted through the annular apertures A and B and are burned in the area above the bed of fuel. This latter function of the admission of additional air is particularly advantageous in that the efficiency of the burning of the solid fuel is increased in the heater of my invention to a point hitherto unattained. This not only results in increased economy of fuel consumption, but also reduces to a minimum the discharge of unburned carbon or soot and provides practically smokeless operation. By reason of this provision for admission of air above the grate as above described, the heater may be filled with fuel to any desired extent, for example to a level such as indicated by the dotted line at F in Fig. 1, without impairing the efficiency of combustion thereof.

When the arrangement shown in Fig. 6 is used, the increased volume and the lowered temperature of the gases is of particular advantage, as it avoids risk of injury to the trees by burning or scorching. The heater may, however, be used without the conducting flues 15, by covering openings 13 with caps 20 fitting over sleeves 14 of said openings 13, and opening the exhaust stack 18 by laying back hinged cover 19.

The operation of the heater under these latter circumstances, or of the form of heater shown in Fig. 7, is substantially the same as above described, with the exception that the gases are delivered upwardly through the central opening in the cover instead of being distributed laterally to the trees. Small heaters of this type may be constructed and operated individually in suitable position adjacent the trees.

I claim:

1. A solid fuel burning orchard heater comprising a plurality of superposed circular sections of successively greater diameter, each of said sections above the lowermost section having its lower edge portion overlapping and connected to the upper edge portion of the next lower section in such manner as to provide a shielded annular ring-shaped aperture therebetween, a fuel supporting grate disposed within the lowermost section, said lowermost section being provided with air admitting openings beneath said grate, and a cover mounted upon the uppermost of said sections.

2. A solid fuel burning orchard heater as set forth in claim 1, in which there are three of said sections and in which the annular aperture between the uppermost section and the intermediate section is of substantially greater radial width than the annular aperture between the intermediate section and the lowermost section.

3. A solid fuel burning orchard heater as set forth in claim 1, said cover being provided with an opening of materially less diameter than the heater, and said heater further comprising a stack removably mountable on said cover around said opening.

4. A solid fuel burning orchard heater as set forth in claim 1, the uppermost of said sections being provided with an opening in the side wall thereof adapted for connection of a distributing pipe thereto.

5. A solid fuel burning orchard heater as set forth in claim 1, the uppermost of said sections being provided with a plurality of openings, and said heater further comprising a plurality of distributing pipes connected to said openings and extending to points laterally spaced from said sections.

6. A solid fuel burning orchard heater as set forth in claim 1, the uppermost of said sections being provided with an opening and with removable closure means for said opening, there being three of said sections and the annular aperture between the uppermost and intermediate sections being of greater radial width than the annular aperture between the intermediate and lower sections.

7. A solid fuel burning orchard heater as set forth in claim 1, said cover being provided with a substantially central opening and with removable closure means for said opening.

In testimony whereof I have hereunto subscribed my name this 9th day of February, 1931.

WILLIAM C. SCHEU.